United States Patent [19]

Stumpf

[11] 4,444,523
[45] Apr. 24, 1984

[54] DEVICE FOR CONNECTING PLATES AND/OR RODS

[75] Inventor: Walter J. Stumpf, Hochberg, Fed. Rep. of Germany

[73] Assignee: Mero-Raumstruktur GmbH & Co. Wurzburg, Wurzburg, Fed. Rep. of Germany

[21] Appl. No.: 324,018

[22] Filed: Nov. 23, 1981

[30] Foreign Application Priority Data

Nov. 19, 1980 [DE] Fed. Rep. of Germany ... 8030908[U]

[51] Int. Cl.³ .............................................. F16B 7/00
[52] U.S. Cl. ................................... 403/173; 403/287
[58] Field of Search ...................... 403/287, 22, 21, 8, 403/7, 298, 292, 170, 171, 172, 174, 176, 178, 267, 364, 173

[56] References Cited

U.S. PATENT DOCUMENTS

| | | | |
|---|---|---|---|
| 2,720,405 | 10/1955 | Kennedy | 403/292 X |
| 3,129,472 | 4/1964 | Hensel | 403/7 |
| 3,574,510 | 4/1971 | Herman | 403/8 |

FOREIGN PATENT DOCUMENTS

| | | | |
|---|---|---|---|
| 2018388 | 10/1971 | Fed. Rep. of Germany | 403/292 |
| 2736635 | 10/1978 | Fed. Rep. of Germany | 403/171 |

*Primary Examiner*—Andrew V. Kundrat
*Attorney, Agent, or Firm*—Jacobi, Siegel, Presta, Marzullo & Aronson

[57] ABSTRACT

A device for connecting plates and/or rods of the light construction type made of wood, plastic or the like, with junction pieces having a plurality of threaded holes whose axes intersect at the center of each junction piece. Tap bolts are disposed in the area of the plate corners and/or the rod extremities so they can rotate and slide axially in the planes of the plates and/or along the axes of the rods, which can be screwed into the threaded holes of the junction pieces. The tap bolts are mounted in dowel-like shells which have at their outer ends an abutment for each tap bolt. The shells are pressed and/or glued into boreholes in the area of the plate corners and/or extremities of the rods. A drive-collar is mounted on the shank portion of the tap bolts protruding from the shells.

6 Claims, 11 Drawing Figures

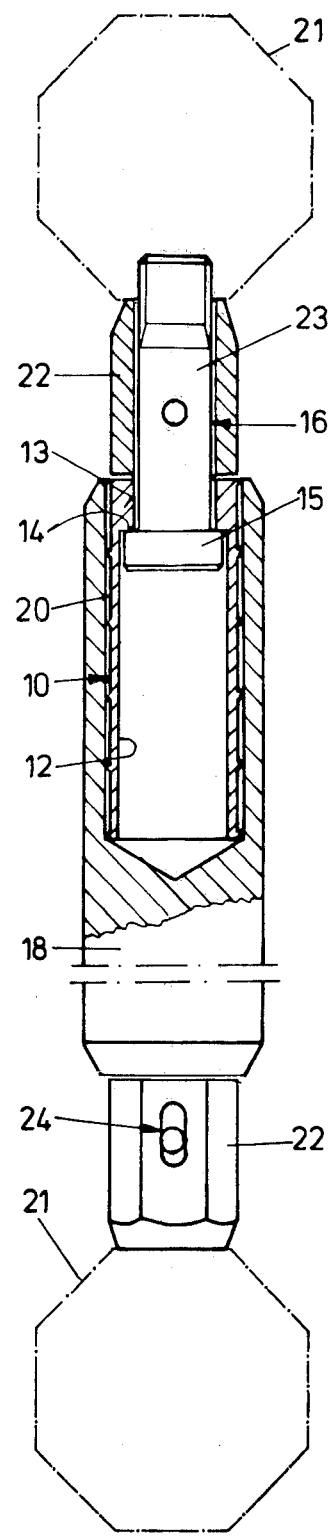
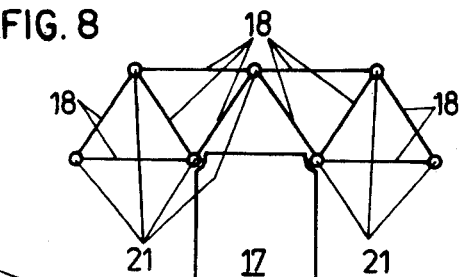
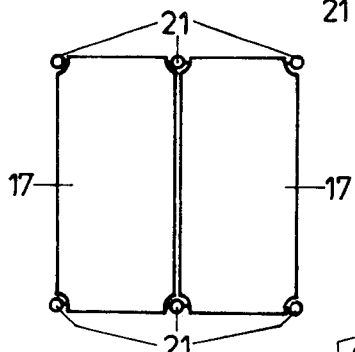
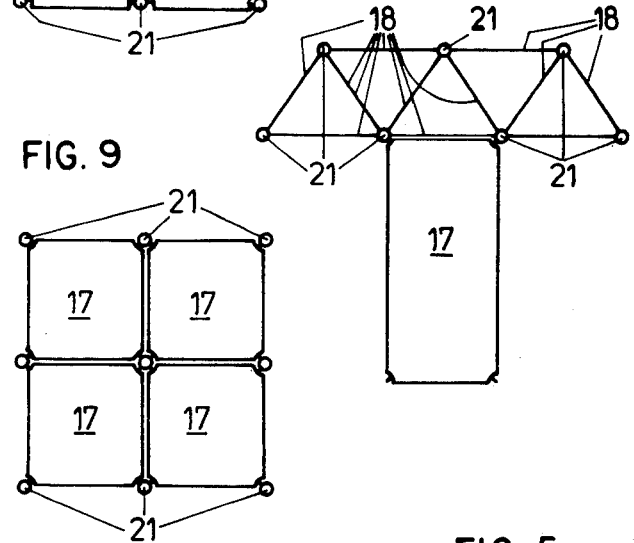
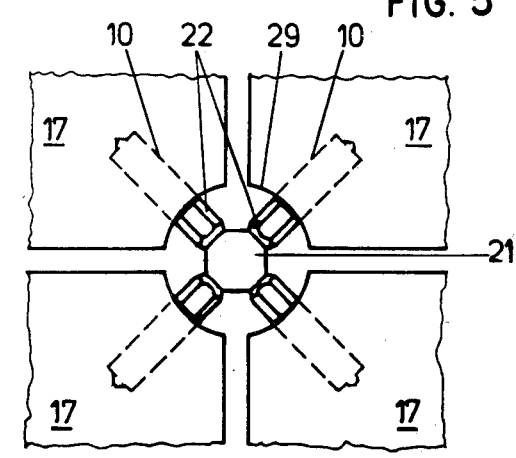

DEVICE FOR CONNECTING PLATES AND/OR RODS

BACKGROUND OF THE INVENTION

The present invention relates to a device for connecting plates and/or rods, in particular light construction plates and rods made of wood, plastic, etc., with junction pieces featuring numerous threaded holes whose axes intersect at the center of each junction piece, and with tap bolts which are disposed so they can be rotated or shifted axially in the area of the plate corners and/or rod extremities within the planes of the plates and/or along the axes of the rods and which can be screwed into the threaded holes of the junction pieces.

Such connecting device is known, e.g., from German DE-OS No. 25 26 660. In that device, however, the tap bolts are mounted into the truncated corners of shallow tub-shaped sheet metal elements which are filled with a compression-resistant material, such as concrete, after the tap bolts have been screwed into the threaded holes of the junction pieces. Since the tap bolts are no longer accessible after such filling, the plates thus formed can no longer be readily disassembled. Such an assembly technique may be suitable for particular applications but it requires a very special plate structure.

In addition, three-dimensional latticeworks are known which consist of metal rods and junction pieces, the latter being provided with numerous concentric threaded holes. In the rod extremities of these known constructions, tap bolts, mounted so they can be rotated and shifted axially, can be screwed into the threaded holes of the junction pieces by means of so-called drive-collars whose connection with the tap bolts is such that the collars cannot rotate but can be shifted axially within certain limits. After the assembly has been completed, these drive-collars are then wedged between the respective junction piece and rod extremity. This assembly construction has proven to be effective in many three-dimensional latticeworks subjected to static stress.

SUMMARY OF THE INVENTION

The object of the present invention is to create a device for the connection of plates and/or rods made of low-strength materials, such as wood, and which are used for light constructions, such as exhibition stands. The device is aimed at permitting an easy assembly and disassembly of the plates and/or rods.

In accordance with the present invention, the task is solved with a device of the type described above in which the tap bolts are mounted in dowel-like shells that feature, near their outer extremity, an abutment for each tap bolt; in which the shells are pressed and/or glued into boreholes in the area of the plate corners and/or in the extremities of the rods; and in which a drive-collar is mounted on the part of the shank of each tap bolt that protrudes from the shell. These dowel-shaped shells can readily be mounted in light construction panels with wood frames, for instance, and equally advantageously in the extremities of rods made of wood, plastic, etc. The dowel-like shells are preferably made of plastic, and the tap bolts are securely held in these shells so they can rotate and also slide axially within the required limits. By means of the drive-collars, the tap bolts can readily and rapidly be screwed into the threaded holes of the junction pieces, as is already known for the above-cited three-dimensional latticeworks. Depending on the number of configuration of the threaded holes designed into a junction piece as well as on the placement of the dowel-like shells in the area of the plate corners, numerous possible shapes for wall and ceiling structures become possible, in potential combination with flat or three-dimensional lattices.

The anchoring of the dowel-like shells in the boreholes housing them can even be improved, according to one embodiment of the invention, if the dowel-like shells are provided on their periphery with numerous annular anchoring ribs that are axially evenly spaced with a cross-section in the shape of a barbed hook.

If, according to another embodiment of the invention, one of the annular anchoring ribs, at least, is placed immediately next to the outermost of the two extremities of the dowel-like shells, a clean closure of the respective borehole is achieved which may also prevent the escape of adhesive material.

If, according to a further embodiment of the invention, the corners of the plates are partially cut away to receive the shank portion of the tap bolt carrying the drive-collar, it is possible to achieve advantageously relatively narrow gaps between the plates. In other words, the lateral distance between neighboring plates can thereby be kept relatively small.

Various layouts for the shells for rectangular as well as square plates are set forth in the claims.

BRIEF DESCRIPTION OF THE DRAWINGS

The invention is illustrated below in greater detail by drawings of representative embodiments.

FIG. 5 is a plan view of the corner area of four plates which are connected to a junction piece by means of connection devices according to the present invention;

FIG. 6 is an elevational view, partially in section, of a wooden rod with connection devices according to the present invention mounted in its extremities and, in broken lines, indicates the junction pieces with which the rod is connected;

FIGS. 7–10 are diagrammatic views showing the use of the connection device for plates serving as ceiling or wall elements.

DESCRIPTION OF THE PREFERRED EMBODIMENTS

Figure 1:
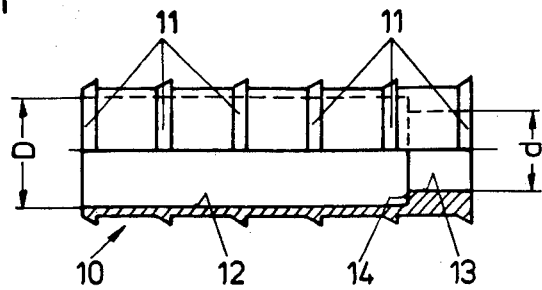
FIG. 1 is an elevational view, partially in section, of the dowel-like shell for the connection device according to the principles of the present invention.

The connection device according to the present invention has a dowel-like shell 10 which, in the examples of embodiments, is made of plastic. On the outside periphery of the dowel-like shell 10, annular anchoring ribs 11 are disposed at uniform axial spacing which display a cross-section in the shape of a barbed hook which is tapered in the direction of insertion for shell 10. In the sample embodiment the arrangement of these anchoring ribs 11 is so designed, in addition, that one, each, is placed directly at the inner and outer ends of shell 10. Shell 10 presents over most of its length a bore of diameter D, followed near the outer end of the shell by a bore 13 with a reduced diameter d. This creates near the outer end of shell 10 an annular abutment 14 for the head 15 of bolt 16 which is housed in shell 10, e.g., in the manner shown in FIG. 6.

Figure 4:
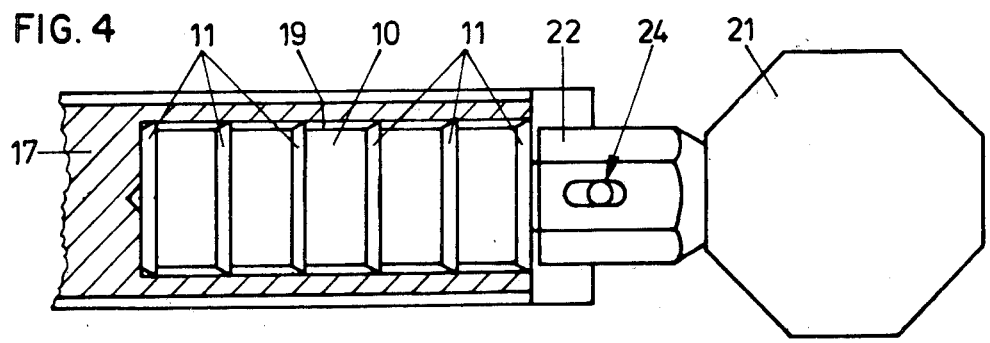
FIG. 4 is an elevational view, partially in section, of the connection device mounted in a plate, connected to a junction piece.

Dowel-like shell 10 can optionally be mounted in the corner areas of plates 17 (FIG. 4) parallel to the plane of the plate, or coaxially, in he extremities of rods 18. Plates 17 and/or rods 18 are provided to this effect with appropriate boreholes 19 and/or 20, whose dimensions are such that the dowel-like shells can be pressed into these boreholes, after which pressed insertion the annular anchoring ribs practically bond the shells into the plate and/or rod. The strength of this bond can be made even greater by introducing an adhesive material between the elements to be bonded.

In the example of an embodiment shown, rods 18 are made of wood while plates 17 consist of so-called light construction panels which may, e.g., be composed of softwood frames with honeycomb paper inserts. Holes 19 are bored into the softwood frame of the light construction plates.

As indicated above, the connection between plates 17 and rods 18 is assured by tap bolts housed in shells 10 and by junction pieces 21 which, in a well known manner, feature have eighteen concentric threaded holes (not shown). Tap bolts 16 can be screwed into said threaded holes by means of drive-collars 22 which are mounted on respective shank portions 23 protruding from shells 10 using pin-and-slot connections 24 so that, in relation to said shanks, they cannot rotate but can slide axially within certain axial limits. When the connection has been established (FIGS. 4 and 6) drive-collars 22 are securely wedged between junction pieces 21 and the outer end of shells 10.

Figure 2:
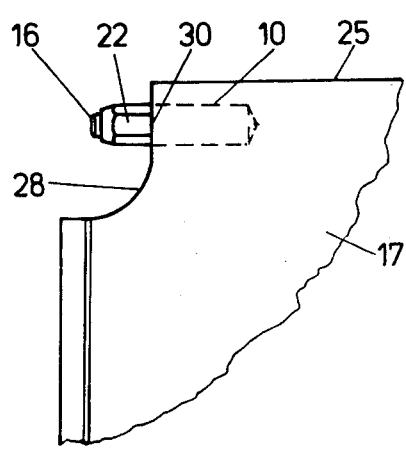
FIGS. 2 and 3 are enlarged plan views, with parts broken away, of the disposition of the connection device according to the present invention in the area of the corners of rectangular plates.

By tapping bolts 16 of neighboring plates 17 into the bores in the junction pieces 21, plates 17 can be added in interconnected relation. Thereby the bolts 16 can be adjusted on the corners of the plates 17 according to FIG. 2 or FIG. 3. The connection of the plates 17 through an adjustment of the bolts 16 according to FIG. 2 is illustrated in FIG. 7, while the connection of plates 17 with an adjustment of the bolts 16, according to FIGS. 3 and 5, is illustrated in FIG. 9.

Figure 3:
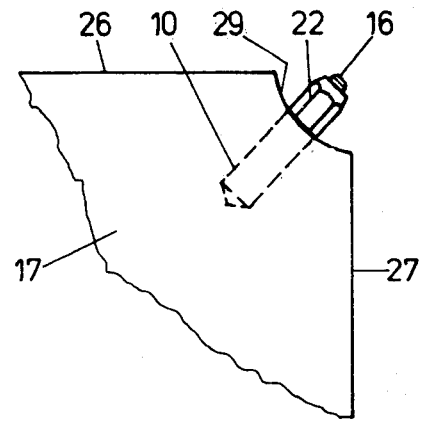

Depending on the various applications of plates 17 as wall or ceiling elements, etc., shells 10 are positioned with their tap bolts 16 either parallel to the respective neighboring outer edge 25 of plate 17 (FIGS. 2, 7 and 8) or at a 45° angle to neighboring outer edges 26 and 27 of plate 17 (FIGS. 3, 9 and 10). In the embodiment of FIG. 9, the axes of shells 10 and tap bolts 16 lie along the diagonals of plate 17. As is clearly shown in FIGS. 2, 3 and 5, cutouts 28 and 29 are provided at the corners of plates 17 so as to accommodate essentially drive-collars 22 and shank portions 23. In the embodiment of FIG. 2, this cutout includes a rectilinear portion from which bolt 16 protrudes, while in the embodiment of FIGS. 3 and 5, cutout 29 is formed by an arc of uniform radius.

Figure 11:
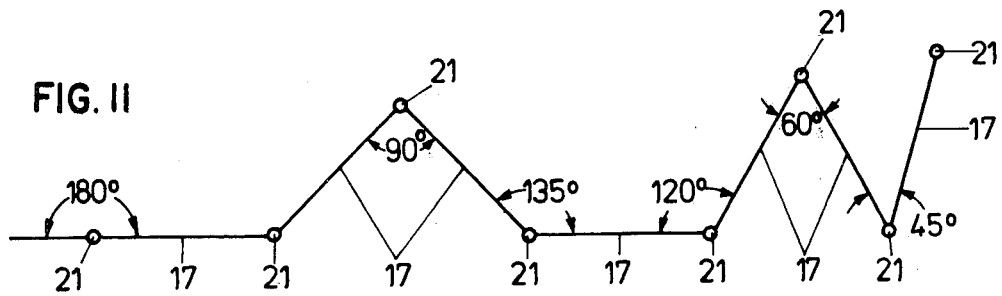
FIG. 11 is a diagrammatic view of a floor plan showing the various possibilities for connecting wall elements by means of connection devices according to the present invention, using junction pieces featuring eighteen concentrically disposed threaded holes.

When plates 17 are used as wall elements, it is possible to form the floor plan angles indicated in the diagram of FIG. 11, provided junction pieces 21 with 18 concentric threaded holes are used, whose bore axes form angles of 45°, 60°, 90°, 120°, 135° and 180°. In this manner, floor plan angles can be changed without causing a change in the gap between the connected elements.

FIGS. 8 and 10 illustrate in their upper portions schematic space frames composed, e.g., of wooden rods 18 and junction pieces 21 (made of metal or plastic) according to FIG. 6, where plates 17 serving as wall elements can be connected directly to junction pieces 21 of the lower chord by tap bolts 16 on the ends of the wooden rods 18. As is shown in the arrangement of shells 10 and tap bolts 16 in FIGS. 2 and 8, plates 17 can, as is already well-known, be substituted for rods 18 of the lower chord. At the lower chord of these space frames, there is downwardly hanging plate 17. According to the configuration in FIG. 3, this plate 17 has in its upper edges tap bolts 16 which are tapped into bores of two junction pieces 21 in the lower chord of the space frame.

When plates 17 are used as ceiling elements, shells 10 and tap bolts 16 are arranged as in FIGS. 3 and 5, so as to achieve the configuration shown by FIG. 9. It is possible, in this setup, to have plates 17 serving as ceiling elements substitute for all the rods of the lower chord of the three-dimensional truss involved.

FIG. 11 is a schematic top view of upstanding plates 17 which are connected with each other at different angles by two junction pieces 21 as wall-elements (compare also FIG. 7). These different connection-angles require junction pieces 21 with eighteen concentric bores in the central point.

The gaps existing between plates 17 in their mounted position can be bridged by plastic divider strips which also serve as edge protectors for the plates (not shown). The hollow space in these strips can be used to lay electrical cables or other wiring.

What is claimed is:

1. Device for connecting plates and rods, in particular light construction plates and rods made of wood, plastic or the like, with junction pieces which have numerous threaded holes whose axes intersect at the center of each junction piece, and with tap bolts disposed in the area of the plate corners and the rod extremities so they can rotate and slide axially in the planes of the plates and along the axes of the rods, said tap bolts being receivable in the threaded holes of the junction pieces, characterized in that the tap bolts (16) are mounted in dowel-like shells (10) which have at their outer end an abutment (14) for each tap bolt, that the shells (10) are fixedly secured in boreholes (19, 20) in the area of the plate corners (17) and the extremities of the rods (18), that a drive-collar (22) is mounted on the shank portion (23) of the tap bolts (16) protruding from the shells (10) and that the corners of the plates (17) are cut out so as to accommodate the shank portion (23) of the tap bolts (16) carrying the drive-collar (22).

2. Device as in claim 1, characterized in that the dowel-like shells (10) are provided on their outer periphery with numerous, axially spaced, annular anchoring ribs (11) whose cross-section is in the shape of a barbed hook.

3. Device as in claim 2, characterized in that an annular anchoring rib (11) is located at least immediately next to the outer-most of the two extremities of the dowel-like shells (10).

4. Device as in claim 1 characterized in that in rectangular plates (17) the axes of the boreholes (19) for housing the shells (10) are positioned parallel to the neighboring outer edge (25) of the plates (17).

5. Device as in claim 1 characterized in that in rectangular plates (17) the axes of the boreholes (19) for housing the shells (10) are positioned to form an angle of approximately 45° with the neighboring outer edges (26, 27) of the plates (17).

6. Device as in claim 1 characterized in that in square plates (17) the axes of the boreholes (19) for housing the shells (10) are aligned along the diagonals of the plates (17).

* * * * *